(No Model.)
J. W. HURD.
BREAD OR CAKE KNIFE.
No. 527,175. Patented Oct. 9, 1894.
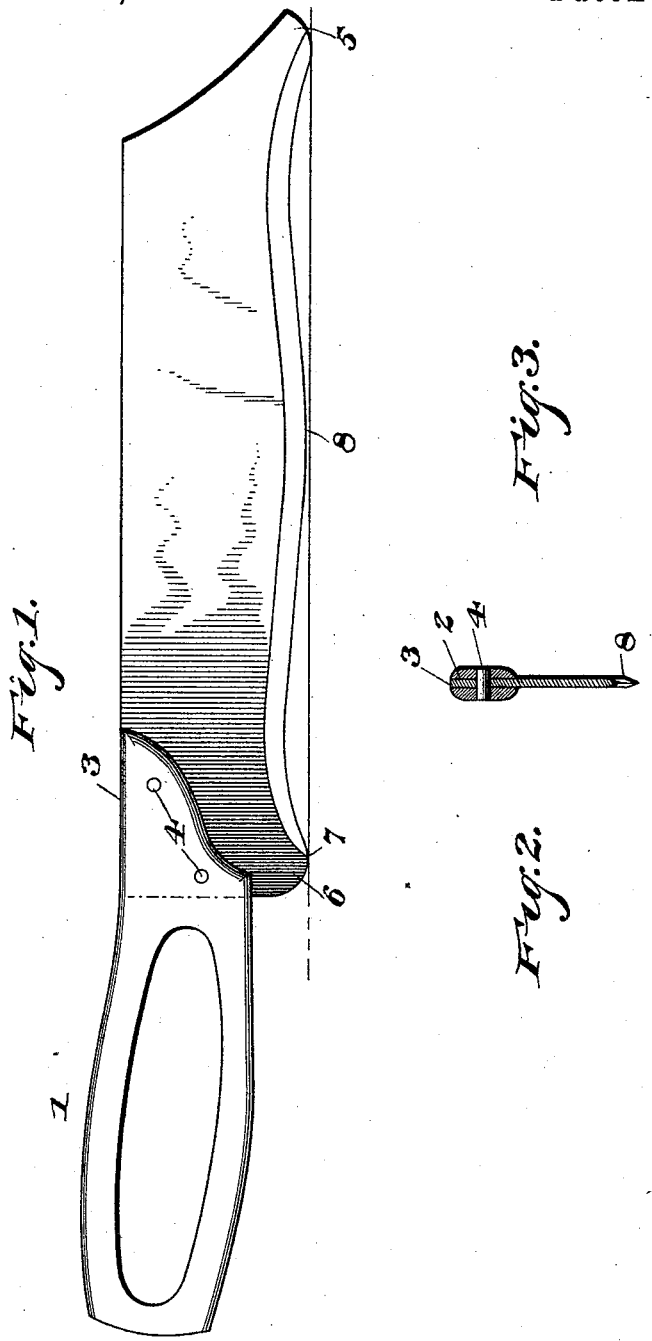
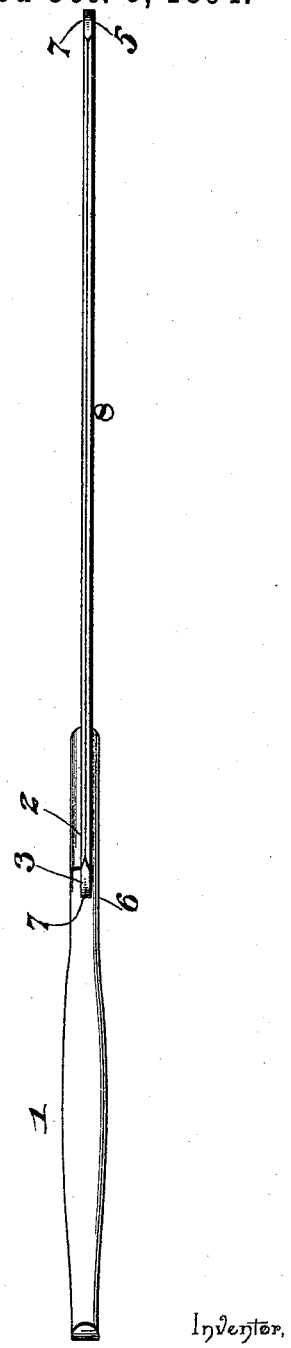
Witnesses
B. S. Ober
W. S. Duvall
Inventor,
Joseph W. Hurd,
By his Attorneys,
C. A. Snow & Co.

UNITED STATES PATENT OFFICE.

JOSEPH W. HURD, OF BELVIDERE, ILLINOIS.

BREAD OR CAKE KNIFE.

SPECIFICATION forming part of Letters Patent No. 527,175, dated October 9, 1894.

Application filed November 2, 1893. Serial No. 489,849. (No model.)

*To all whom it may concern:*

Be it known that I, JOSEPH W. HURD, a citizen of the United States, residing at Belvidere, in the county of Boone and State of Illinois, have invented a new and useful Bread or Cake Knife, of which the following is a specification.

My invention relates to improvements in bread and cake knives, the objects in view being to produce a knife which by reason of its peculiar formation is adapted to cut bread and cake, either hot or cold, and to accomplish the same in a smooth manner without tearing or marring the same; and which furthermore is so formed as to prevent injury to the table-cloth or other support upon which the bread or cake may rest by reason of the edge of the knife coming in contact therewith; and finally to preserve the cutting edge by reason of its being prevented from contacting with the support.

With these and other objects in view the invention consists in certain features of construction hereinafter specified and particularly pointed out in the claim.

Referring to the drawings:—Figure 1 is a side elevation of a knife embodying my invention. Fig. 2 is a vertical transverse sectional view through the knife-handle and heel of the blade. Fig. 3 is an edge view of the knife.

Like numerals of reference indicate like parts in all the figures of the drawings.

The handle 1 is in the present instance formed of cast-metal, though the same may be of any other material, and so shaped exteriorly as to form a convenient grip. The front end of the handle is provided with a kerf or slot 2, and into the same is let the upper rear corner of the blade 3, the latter being secured in position through the medium of rivets 4 passed though the walls of the kerf or slot and the blade. The blade is of any desired thickness and width, and is forwardly extended at its lower front corner to form the toe 5. The rounded toe 5 and the rounded heel 6 are in the same plane and are left blunt and smooth so as to form rest or guard-portions 7. Between these points the blade is compoundly curved and beveled as indicated at 8, thus forming a curved cutting edge that disposes the widest part of that portion of the blade having a cutting edge at the center of the blade. This completes the knife, and it will be seen, by reason of the irregular curvature and location of the cutting-edge, that regardless of the direction of movement of the knife or the point at which the cutting is carried on, a shearing cut is produced, which facilitates the cutting operation as is well known, and prevents crumbling and otherwise marring the loaf or cake from which the slice is being cut. The widest part of the portion of the blade having the cutting-edge is slightly above the plane of the toe and heel-guards of the knife, so that the cutting-edge can never come in contact with the support upon which the article being operated upon or cut is located. Hence it follows that in cutting bread or cake when the knife has descended through the same, and the slice has been severed, the guards will rest upon the table or tablecloth, and being blunt or unsharpened will not injure the same, and furthermore, it will be seen that the cutting-edge being maintained out of contact with the table or tablecloth can never be dulled by reason of such contact which is a common disadvantage in bread knives as heretofore constructed.

From the foregoing description in connection with the accompanying drawings it will be seen that I have provided a very simple, durable and cheaply constructed bread-knife designed to cut the same while either in a hot or cold state in a clean manner without crumbling or tearing or otherwise marring the loaf or cake, and whose cutting edge will be preserved against dulling by contact with the support of the loaf or cake, and furthermore that said support will be preserved against marring or cutting by the knife.

Having described my invention, what I claim is—

The herein-described bread and cake knife having a blade provided with front and rear rounded blunt or unsharpened toe and heel portions at the lower front and rear corners thereof, the outer edges of said toe and heel portions being in the same longitudinal plane and adapted to come in sliding contact with the support for the food-stuff being cut, and a compoundly curved and beveled cutting edge formed between the rounded toe and heel portions the widest point of the portion of the blade provided with said cutting edge being located at a central point of the blade and above the plane of the blunt or unsharpened toe and heel portions thereof whereby said cutting edge will be prevented from coming in contact with the support for the food stuff being cut to obviate cutting of the support and a dulling of the cutting edge, substantially as set forth.

In testimony that I claim the foregoing as my own I have hereto affixed my signature in the presence of two witnesses.

JOSEPH W. HURD.

Witnesses:
  JOHN C. LONGCOR,
  FRED E. BARKER.